United States Patent [19]
Stelniceanu

[11] 3,964,763
[45] June 22, 1976

[54] WHEELED PUSH-CART HAVING THE UPPER PORTION OF THE HANDLE LOWERABLE FOR CONVENIENCE OF CARRYING

[76] Inventor: Jacques Dominique Stelniceanu, Room 309, 1911 Jefferson Davis Highway, Arlington, Va. 22202

[22] Filed: Nov. 26, 1973

[21] Appl. No.: 418,864

Related U.S. Application Data
[63] Continuation-in-part of Ser. No. 209,105, Dec. 17, 1971, Pat. No. 3,774,391.

[52] U.S. Cl. .......................... 280/47.17; 280/DIG.3
[51] Int. Cl.² ........................................ B62B 1/12
[58] Field of Search........... 280/47.24, 47.26, 47.17, 280/36 C, DIG. 3; 16/111 R, 112

[56] References Cited
UNITED STATES PATENTS

| | | | |
|---|---|---|---|
| 2,758,847 | 8/1954 | Shone | 280/47.37 R |
| 2,858,140 | 10/1958 | Stamp | 280/36 C |
| 3,462,924 | 8/1969 | Price et al. | 280/47.37 R X |

FOREIGN PATENTS OR APPLICATIONS

| | | | |
|---|---|---|---|
| 1,466,535 | 12/1966 | France | 280/47.26 |
| 256,990 | 9/1948 | Switzerland | 280/36 C |
| 1,126,122 | 9/1968 | United Kingdom | 280/47.26 |

*Primary Examiner*—Philip Goodman
*Assistant Examiner*—John A. Pekar

[57] ABSTRACT

The invention relates to an improved wheeled push-cart having the optional feature of being easily carried by hand upon the lowering of the upper portion of the handle.

3 Claims, 8 Drawing Figures

WHEELED PUSH-CART HAVING THE UPPER PORTION OF THE HANDLE LOWERABLE FOR CONVENIENCE OF CARRYING

The present application is a continuation-in-part of my co-pending application, Ser. No. 209,105, filed Dec. 17, 1971, now U.S. Pat. No. 3,774,391 and titled PUSH-CART HAVING METALLIC WIRE FRAME.

This invention relates to a wheeled push-cart such as may be used for transporting small articles of relatively light weight, by pushing or pulling said cart, or optionally, by lowering the upper portion of the handle and carrying the cart after the manner of a travelling bag, suitcase, or other article having handle means.

The improvement in the device as herein disclosed comprises means for lowering the upper portion of the handle by folding the same downwardly against the frame of the cart, said means also serving to maintain the said upper portion in upright position by the exertion of counteracting tension.

For the purpose of providing a handle which may be lowered into an unobtrusive position, the handle is made in two parts. The upper portion is so formed as to provide its own tension while upright, and to be easily contracted to release the retaining members which hold it upright, so that it may be lowered at will.

For a better understanding of the invention, reference is made to the accompanying drawings, wherein -

FIG. 3 shows another type of retaining member with the latter affixed upon the upper handle member, while

Figure 1:
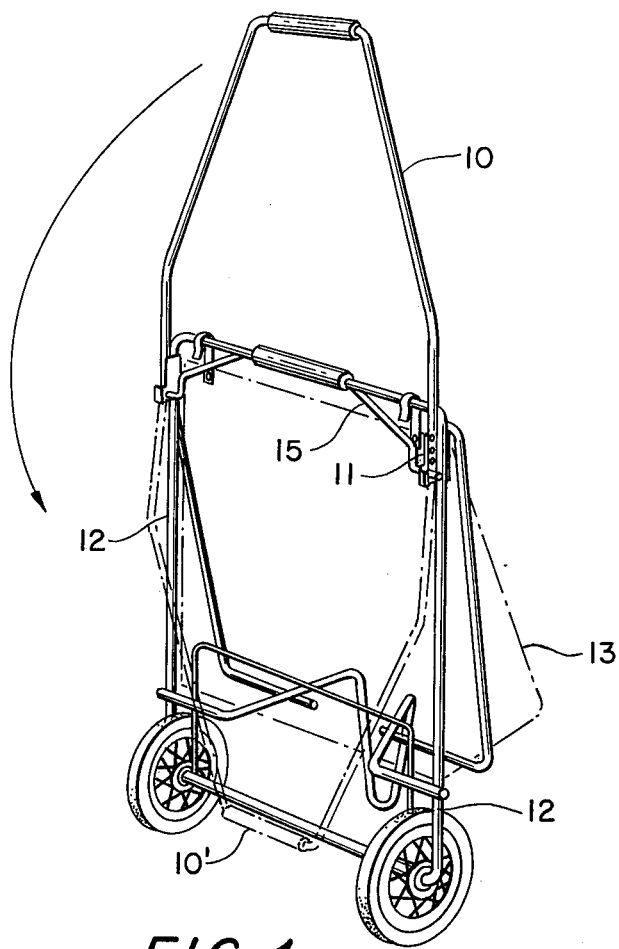
FIG. 1 is a perspective view of the push-cart showing the handle in upright position, with an arrow indicating the downward direction of movement when the handle is lowered.

Referring more particularly to the drawings, wherein like numerals indicate like parts in all figures, FIG. 1 shows upper handle 10 in upright position, while broken line 10' shows the handle in lowered position to permit the cart to be easily carried. Said upper handle 10 is connected by clip members 11, 11 to lower handle member 12, with removable container 13 attached to the frame comprising said members.

Figure 2:
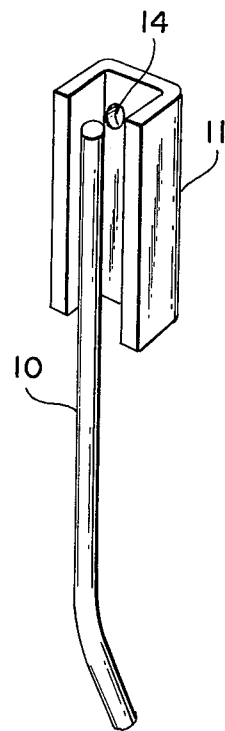
FIG. 2 is a detail of a type of retaining member which may be employed to hold the handle in position.

The clip member in FIG. 2 is shown as it appears when handle 10 is in lowered position, with circular opening 14 as the means through which angular stop bar 15 (see FIG. 1) is inserted to secure the clip 11 against lower handle member 12 (again refer to FIG. 1) and thus enable the upper handle member 10 to be maintained in upright position.

FIGS. 3, 4, 5 and 6 show another locking means wherein elongated slot 14' in clip 11' is used instead of a circular opening, and a "dogleg" bend in stop bar 15' permits receipt of the center portion of that "dogleg" into said slot, for locked engagement of upper handle 10 against lower handle member 12.

Figure 3:
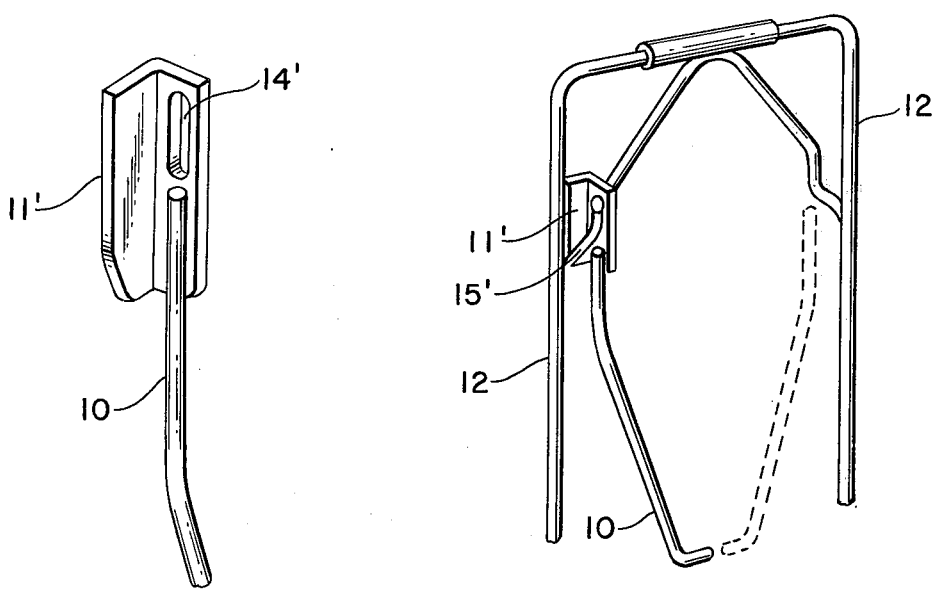

FIG. 3 shows a part of the upper handle 10 which is in lowered position with the clip member extending upwardly therefrom.

Figure 4:
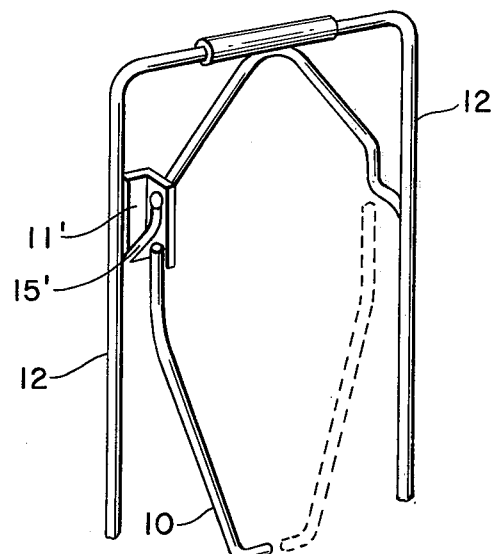
FIGS. 4, 5 and 6 show the same incorporated into an assembly of upper and lower handle members with the handle down, horizontal and upright, respectively.
Figure 5:
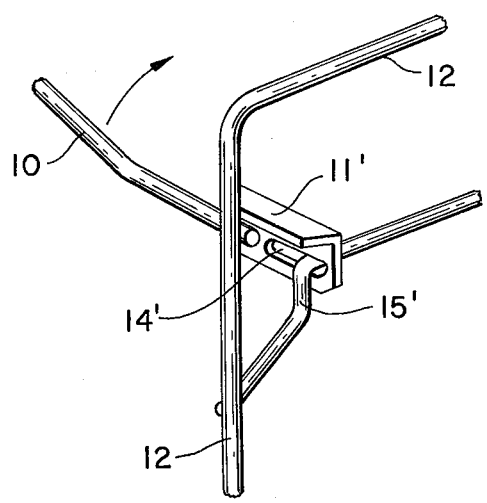
Figure 6:
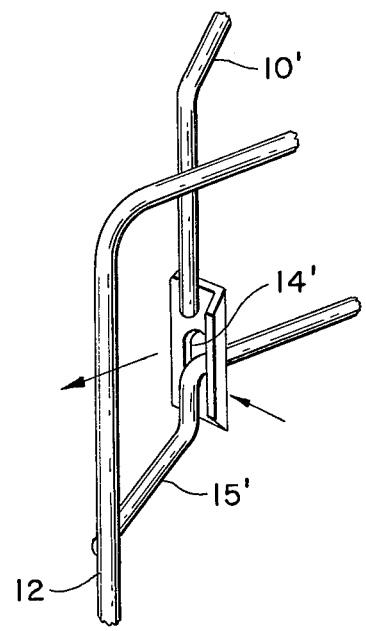

FIG. 4 shows these members forming a part of the cart structure and in FIGS. 5 and 6, upper handle member 10 is shown in lateral and upward positions, respectively.

Figure 7:
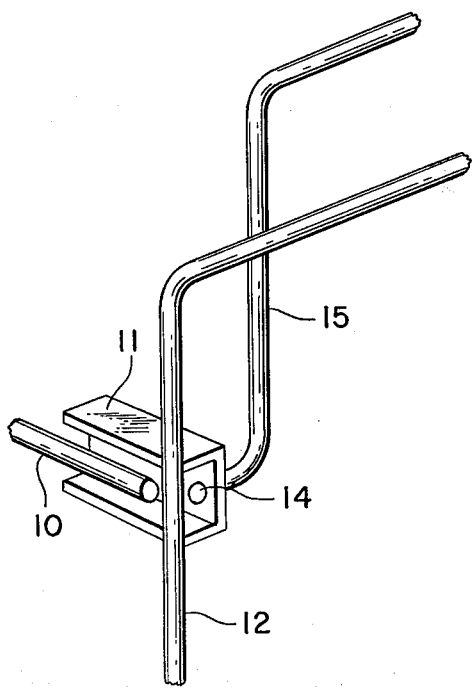
FIGS. 7 and 8 show the retainer of FIG. 2 in lateral and upright positions, respectively, when the handle is extended horizontally and when it is in upright position.
Figure 8:
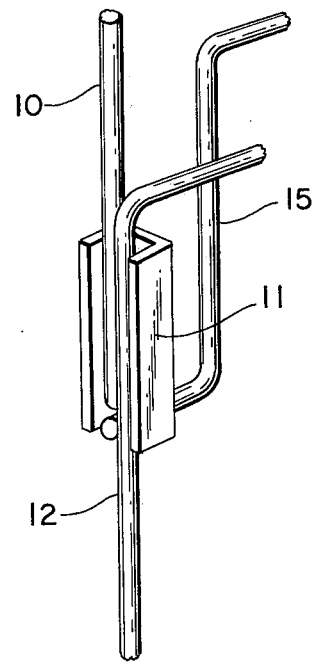

FIGS. 7 and 8 show the means by which clip member 11 is secured against lower handle member 12, with the end of stop bar 15 inserted through circular opening 14.

As appears in the drawings, lowering of the handle is effected by inward lateral compression exerted upon the upper handle member adjacent the clips, thus releasing the stop bar and the lower handle from the clips. Repeated raising and lowering of the handle may be easily accomplished, to meet the requirements for pulling or carrying of the cart.

Inasmuch as the wheel and frame assembly and the removable container have been fully disclosed in my said co-pending patent application Ser. No. 209,105, no further discussion of those features is deemed necessary in this application. The essence of this invention is the optional use of the device as a wheeled push-cart or as a replacement for a conventional shopping bag, such option being exercised by either raising or lowering the handle.

The invention having been thus disclosed, what is claimed is:

1. In a handle for a push-cart having wheels, an article support area, and a two-part handle for optionally raising the upper part, to guide, or lowering said upper part, to carry, said cart, the improvement of said handle comprising a lower handle comprising a pair of parallel side members connected at their lower ends to the said article support area, and an upper handle, comprising a second pair of parallel side members pivotally connected to said lower handle, each of said pairs of parallel side members having an integrally connected transverse member at its upper end, and securing means comprising clip members disposed upon the inner portions of the lower side members, at the upper ends thereof, for engagement of the upper side members, to maintain the latter in raised position; said engagement being releasable by the lateral compression of said upper side members to free the same from said securing means.

2. The invention of claim 1 wherein each said clip member is provided with a substantially circular opening through which a stop bar is inserted, to secure said upper handle member in an upright position or to permit release thereof into a downward position when said stop bar is withdrawn from said opening.

3. The invention of claim 1 wherein each said clip member is provided with an elongated slot into which a portion of a stop bar may be received and retained by tension to hold said upper handle member in an upright position.

* * * * *